P. C. FORRESTER.
MATCH MACHINE.
APPLICATION FILED JUNE 19, 1911.

1,041,989.

Patented Oct. 22, 1912.

5 SHEETS—SHEET 4.

Witnesses.
Edward T. Wray.
M. M. Lindeman

Inventor.
Peter C. Forrester.
by Parker & Carter
attorneys

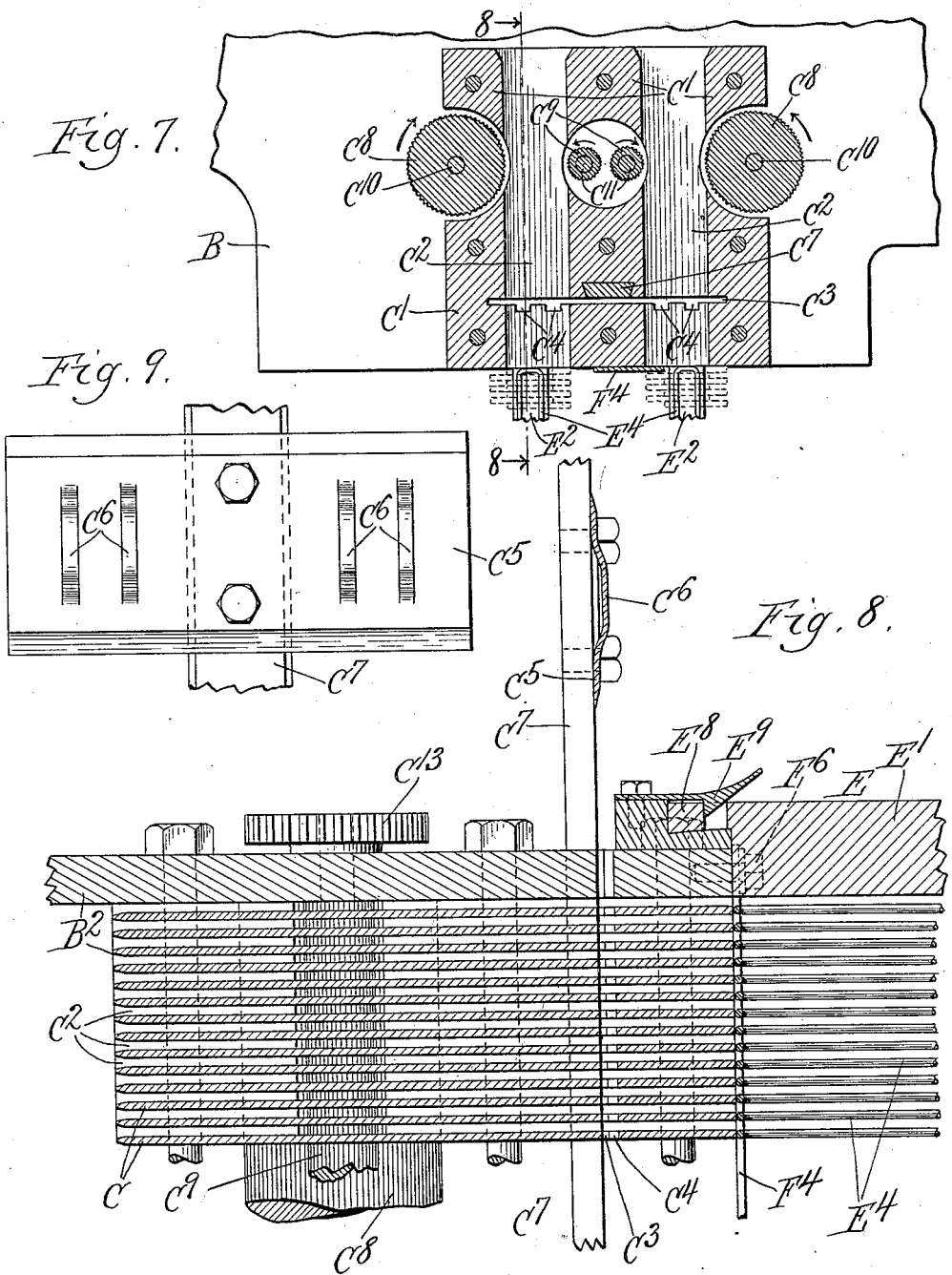

UNITED STATES PATENT OFFICE.

PETER C. FORRESTER, OF TACOMA, WASHINGTON.

MATCH-MACHINE.

1,041,989.   Specification of Letters Patent.   Patented Oct. 22, 1912.

Application filed June 19, 1911. Serial No. 634,123.

*To all whom it may concern:*

Be it known that I, PETER C. FORRESTER, a citizen of the United States, residing at Tacoma, in the county of Pierce and State of Washington, have invented a certain new and useful Improvement in Match-Machines, of which the following is a specification.

My invention relates to improvements in match making machines, which is illustrated diagrammatically in one form in the accompanying drawing, wherein—

Figure 1:
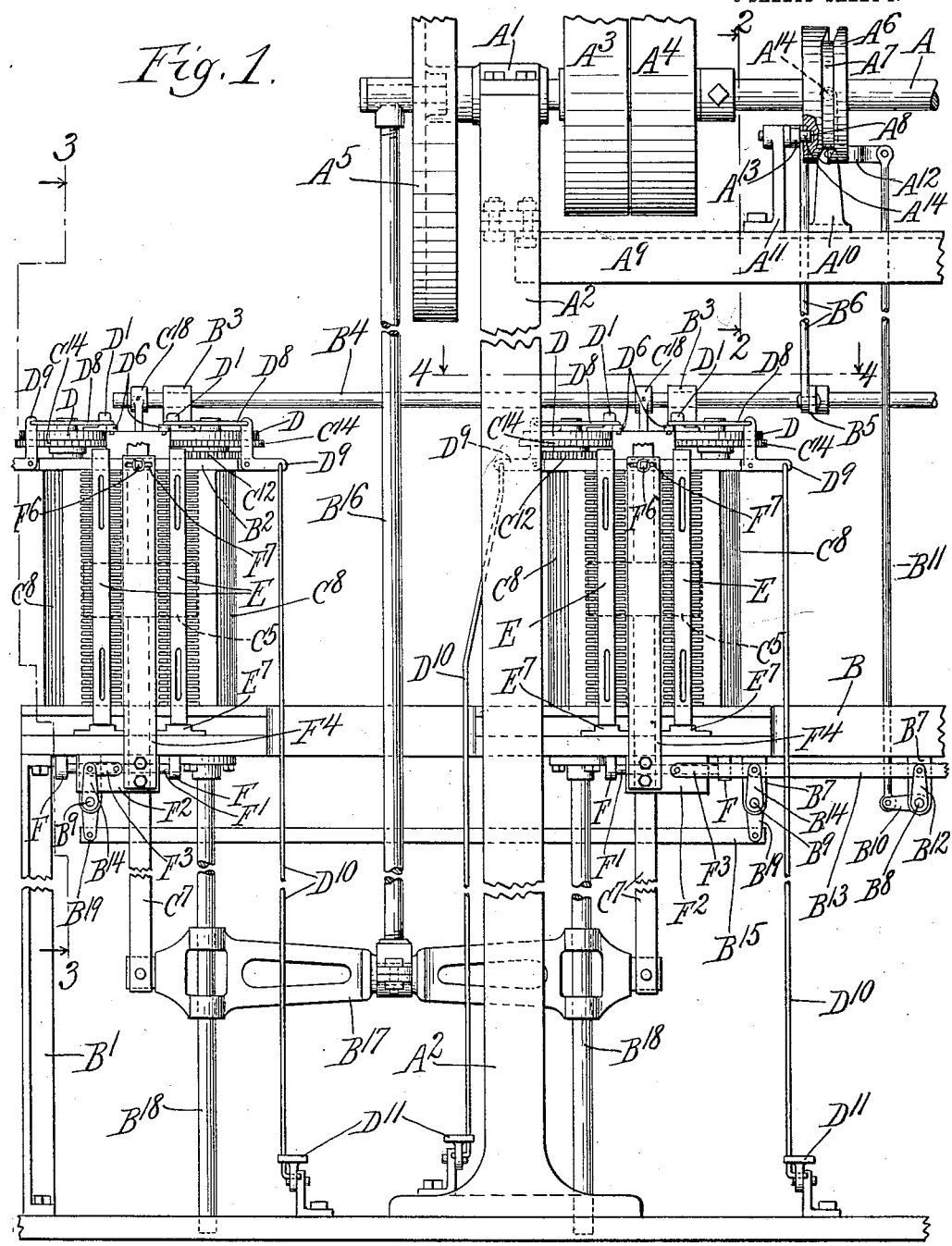
Figure 2:
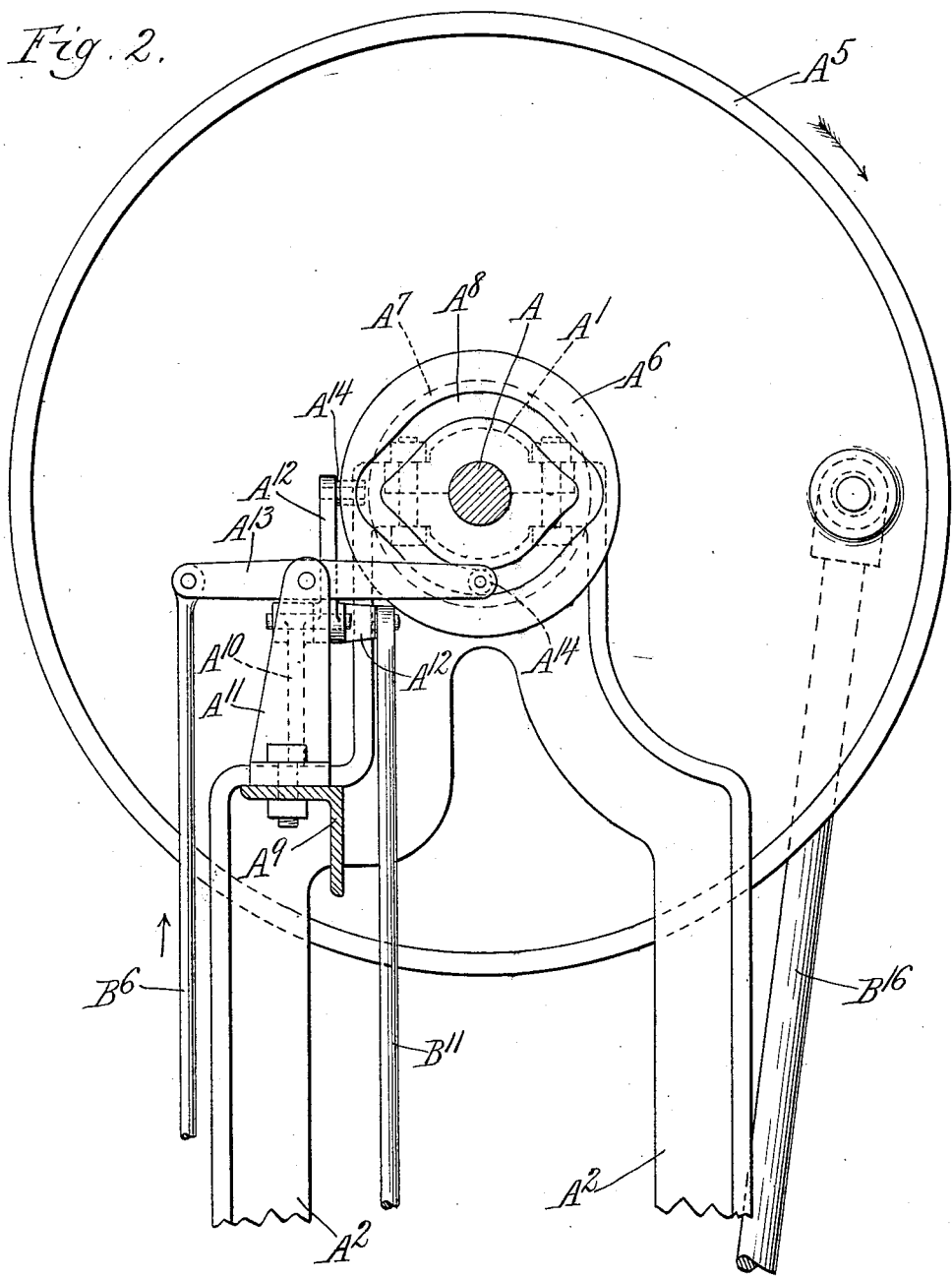
Figure 3:
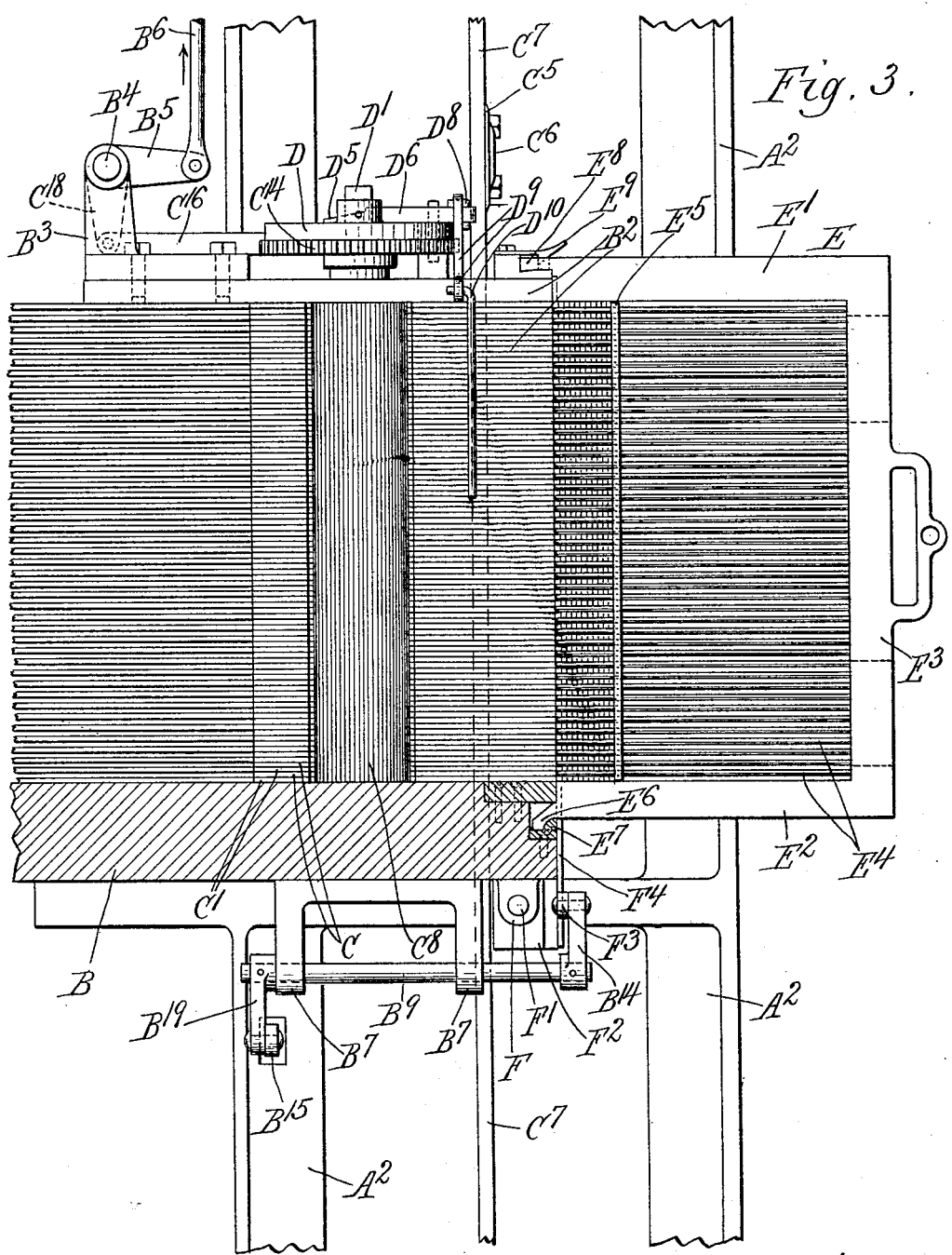
Figure 4:
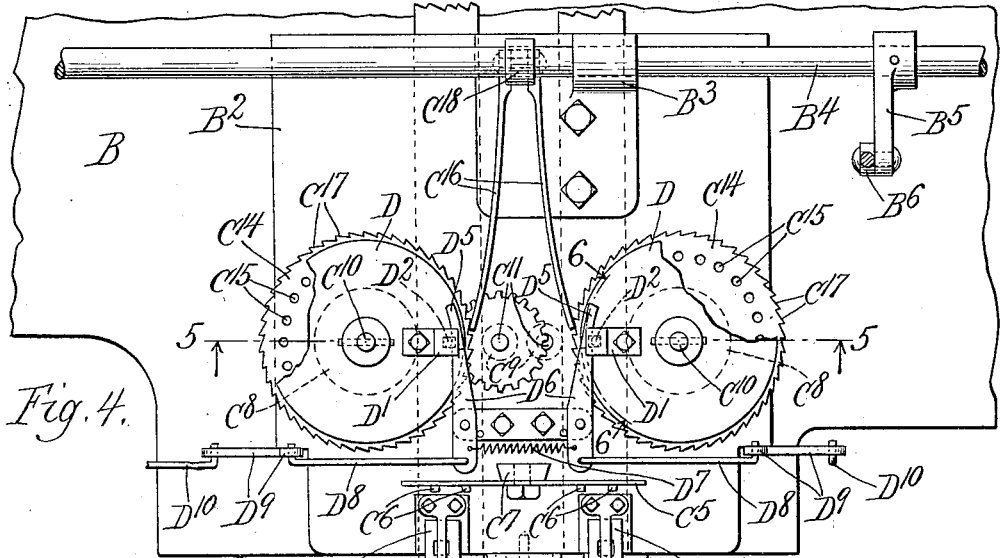
Figure 6:
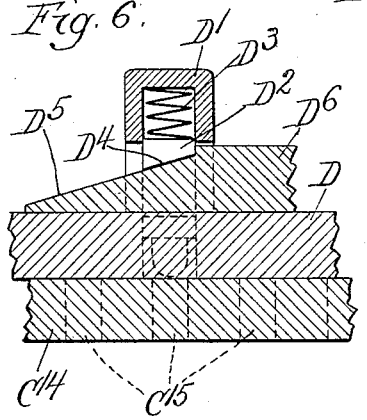
Figure 5:
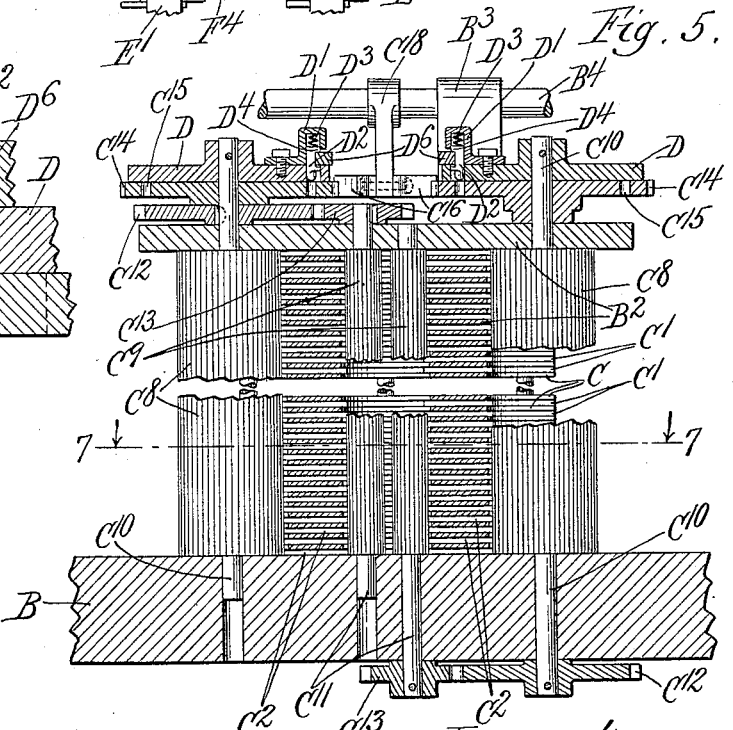

Figure 1 is the front elevation with the knife at mid stroke; Fig. 2 is a section along the line 2—2 of Fig. 1; Fig. 3 is a section along the line 3—3 of Fig. 1; Fig. 4 is a section along the line 4—4 of Fig. 1; Fig. 5 is a section along the line 5—5 of Fig. 4; Fig. 6 is a detail section along the line 6—6 of Fig. 4; Fig. 7 is a section along the line 7—7 of Fig. 5; Fig. 8 is a section along the line 8—8 of Fig. 7; Fig. 9 is a detail of the knife.

Like letters refer to like parts throughout the several drawings.

The driving shaft A rotates in the bearings $A^1$ mounted on the frame $A^2$ and is provided with the tight and loose pulleys $A^3$ $A^4$ and carries the crank disks $A^5$ and the cam disks $A^6$, which cam disks are provided with the two cam slots $A^7$ $A^8$. The frames $A^2$ are connected near their upper extremities by the angle bar $A^9$ upon which is mounted the lugs $A^{10}$ and $A^{11}$ upon which are pivotally mounted the bell crank lever $A^{12}$ and the lever $A^{13}$ having the rollers $A^{14}$ in opposition respectively to the cam slots $A^7$ and $A^8$.

The table B is mounted upon the frames $A^2$ and the supports $B^1$ and carries the anvil blocks $B^2$ from which project the brackets $B^3$ in which is carried the rock shaft $B^4$, upon which is mounted the lever $B^5$ connected by means of the rod $B^6$ to the lever $A^{13}$. The lugs $B^7$ which project downwardly from the table B carry the rock shafts $B^8$ and $B^9$. The arm $B^{10}$ which is rigidly attached to the rock shaft $B^8$ is connected by means of the rod $B^{11}$ to the bell crank lever $A^{12}$, and the arm $B^{12}$ which projects from the rock shaft $B^8$ is pivotally attached to the reciprocating bar $B^{13}$ which in turn is pivotally connected with the levers $B^{14}$ on the rock shafts $B^9$ from which shafts project the levers $B^{19}$ connected by the rod $B^{15}$. The connecting rod $B^{16}$ which is driven by the crank disk $A^5$ drives the cross head $B^{17}$ which is slidably mounted on the cross head guide $B^{18}$.

The anvil blocks $B^2$ which are made up of webs C and spacing blocks $C^1$ forming two vertical groups of veneer slots $C^2$, are provided with the vertically disposed slots $C^3$ at right angles to the slots $C^2$ and having the enlargements $C^4$ intersecting the slots $C^2$. The knives $C^5$ which reciprocate in the slots $C^3$ are provided with the forwardly extending lugs $C^6$ in opposition to the enlargements $C^4$ and are mounted upon the knife bars $C^7$, which are slidably mounted in the anvil blocks and are driven by the cross heads $B^{17}$. The rollers $C^8$ $C^9$ which are located on opposite sides of the veneer slots are rigidly mounted upon the shafts $C^{10}$ $C^{11}$ upon which are keyed the gears $C^{12}$ $C^{13}$ in mesh one with the other and of such size that the peripheral velocity of the two different sized rollers is the same. The ratchet wheels $C^{14}$ which are loosely mounted upon the shafts $C^{10}$, are provided with the perforations $C^{15}$, are driven by the spring pawls $C^{16}$, operating against the teeth $C^{17}$ and driven by the lever $C^{18}$ on the rock shaft $B^4$.

The disk D which is pinned to the shaft $C^{10}$ has rigidly attached thereto the lugs $D^1$ in which is slidably mounted the pin $D^2$ in opposition at its upper end to the spring $D^3$ and provided with the overhanging inclined cam surface $D^4$ in opposition to the inclined surface $D^5$ on the lever $D^6$ which lever is pivotally mounted upon the anvil block $B^2$, is provided with the spring $D^7$ holding it in operative position and is controlled by the connecting rod $D^8$, bell crank lever $D^9$, rod $D^{10}$ and foot lever $D^{11}$.

The veneer case E which has the rigid top $E^1$ and bottom $E^2$ and perforate back $E^3$ contains the spaced spring loop fingers $E^4$ and the slidably mounted false back $E^5$ and is held in position against the front of the anvil block by the hook $E^6$ engaging the lug $E^7$ thereon and the lug $E^8$ engaged by the spring latch $E^9$ thereon, the arrangement of these lugs and hooks being such that the spaces between the spring fingers coincide with the veneer slots $C^2$.

The lugs F downwardly projecting from the bottom of the table A carry the guide bars $F^1$ upon which are slidably mounted the blocks $F^2$ which are driven by the levers $B^{14}$ on the rock shafts $B^9$ through the links $F^3$. The rigid staggering blade $F^4$ projects upwardly from the blocks $F^2$ being held firmly in position and slides back and forth across the face of the anvil block, being steadied at the upper extremity by the bolts F⁶ in the slots F⁷.

It will be evident that while I have shown in my drawing an operative device, still many changes might be made in size, shape and arrangement of parts without departing materially from the spirit of my invention, and I wish therefore, that my drawings be regarded as in a sense diagrammatic.

The use and operation of my invention are as follows: When the machinery is started the rotation of the crank shaft causes the knife bars and the knives to reciprocate back and forth across the veneer strips. The veneer strips are fed into any or all of the anvil blocks until they are brought into opposition to the feed rollers, the foot lever is then depressed, drawing out the latching lever from beneath the cam surface on the spring actuated pin on the disk attached to the roller shaft. This allows the spring actuated pin to descend and engage one of the holes on the ratchet drive wheel, the reciprocation of the rocker arm in response to the movement of the cam disk on the drive shaft rotates the ratchet wheel one tooth at a time and since the roller is attached by the spring to the ratchet wheel the roller also rotates at the same speed, but this speed is so arranged that each feed stroke of the roller advances the veneer strips sufficiently to cause the knife to cut a splint of the desired size from the end of the strip. This process continues until a complete revolution of the roller has been made, when the inclined surface on the spring actuated pin slides up over the latching lever and disengages the pin from the driving wheel, thus stopping the feed. The veneer cases are of such size that one complete revolution of the roller feeds forward sufficient veneer to make splints enough to fill the case. When the veneer case is filled, the operator removes it, replaces it by an empty one, again touches the foot lever and allows the process to repeat itself. It will be observed that the feeding mechanism for each one of the different vertical groups of veneer slots is separate and that there is one splint case for each group of slots, therefore, the machine can be so timed that there is never more than one slot out of commission waiting for the removal of the filled case and the excursion of an empty one. It will be observed that the feed rollers of different sizes are so connected by reducing gears that the peripheral velocity is the same and that the feed is therefore constant. The knives themselves are provided with forwardly extending lugs and these lugs feed the splints forward through the anvil block and force them into the splint case on their passage up and down as they cut the splints off from the veneer strip. In view of the fact that it is necessary to stagger the splints, that is, to separate them so that their ends may be dipped without fastening adjacent ends together, I provide a staggering blade which reciprocates back and forth across the front of the anvil block, one blade being located between each adjacent pair of veneer strips. This blade reciprocates in response to the movement of the cam driving rocker arm, the timing of which cam is such that the staggering blade is always in the neutral position when the knife is cutting the veneer strips and feeding the splints forward. It will be seen that each alternate vertical column of splints is displaced to one side, therefore the adjacent splints in the horizontal belt between any two splint fingers in the splint case are separated and it will also be observed that each belt is separated by one of the spring fingers. The arrangement of the cam actuating feeding ratchet is such that it also feeds when the knife is not cutting from the veneer strips. The sliding back or false back for the veneer case is forced back into the case by the splints as they are fed thereto and the perforations in the case back are provided in order that any suitable instrument or means may be introduced to discharge the splints from the case by forcing forward the false back.

I claim:

1. In a match machine means for feeding veneer strips thereto comprising feed rollers in opposition to the opposed edges of the strips a driving wheel loosely mounted about the axis of one of said rollers means for rotating said rollers in response to the rotation of said driving wheel, and automatic means for breaking the connection between said roller and said wheel.

2. In a match machine means for feeding veneer strips thereto comprising feed rollers in opposition to the opposed edges of the strips a driving wheel loosely mounted about the axis upon said rollers means for rotating said rollers in response to the rotation of said driving wheel and automatic means operative at the end of each revolution for breaking the connection between said roller and said wheel.

3. In a match machine means for feeding veneer strips thereto, comprising feed rollers in opposition to the opposed edges of the strips a driving wheel rotatably mounted about the axis of said rollers and means for detachably connecting said rollers and said driving wheels, said means comprising a disk rotatably connected to said feed roller perforations in said driving wheel and a pin carried by said disk and in opposition to said perforations.

4. In a match machine means for feeding veneer strips thereto, comprising feed rollers in opposition to the opposed edges of the strips a driving wheel rotatably mounted about the axis of said rollers and means for detachably connecting said rollers and said driving wheels, and means comprising a disk rotatably connected to said feed roller perforations in said driving wheel and a pin carried by said disk and in opposition to said perforations and means comprising a latch lever in opposition to said pin for disengaging it from the drive wheel.

5. A match machine comprising a reciprocating knife a shear plate within which said knife reciprocates a splint case and means carried by said knife for feeding splints thereto and means operative in unison with said knife and when it is at the end of its excursion for longitudinally displacing alternate splints in the splint case.

6. A match machine comprising a reciprocating knife, a plurality of splint cases, means comprising said knife for feeding splints to said cases and means operating in unison with said knife for feeding veneer strips thereto and means for automatically interrupting the feed to the knife.

7. A match machine comprising a plurality of reciprocating knives, a plurality of shear plates in which said knives operate, a plurality of splint cases in opposition to said shear plates, means for feeding splints to said cases, means operative in unison with said knife for feeding the strips thereto and independent automatic means for interrupting the feed to each knife.

8. A match machine comprising splint cases, means for feeding splints transversely in parallel rows thereto and means for displacing alternate splints in each row.

9. A match machine comprising splint cases, means for feeding splints in parallel rows thereto and means for displacing alternate splints in each row, said means comprising a blade perpendicular to said rows and reciprocating in a plane perpendicular to the splint case.

10. A match machine comprising splint cases and means for feeding splints transversely thereto and means for longitudinally displacing alternate splints in groups when said feeding means are not operative.

11. A match machine comprising splint cases arranged in groups and means for feeding splints thereto and means for longitudinally displacing alternate splints in groups when said feeding means are not operative said means comprising a blade reciprocating between adjacent cases in a plane perpendicular to the direction of the feed and in a direction parallel with the axis of the splints.

12. A match machine comprising a shear plate a splint case in opposition to said shear plate means for feeding splints from said plate to said splint case and means for longitudinally displacing alternate splints as they enter splint cases.

13. A match machine comprising a shear plate, a splint case in opposition to said shear plate means for feeding splints from said plate in parallel rows to said splint case and means for longitudinally displacing alternate splints in each row as they enter the splint case.

14. A match machine comprising a shear plate, a splint case in opposition to said shear plate means for feeding splints from said plate in parallel rows to said splint case and means for longitudinally displacing alternate splints in each row as they enter the splint case said means comprising a reciprocating blade.

15. A match machine comprising a frame, shear plates mounted thereon, a driving shaft, cross heads driven thereby, knife bars carried by said cross heads and knives carried by said bars and reciprocating within said shear plates, means for feeding veneers through said plates to each of said knives, splint cases in opposition to said plates and means for feeding splints transversely into said cases.

16. A match machine comprising a frame, a driving shaft, crossheads carried by said frame and a plurality of shear plates mounted thereon, knife bars driven by said crossheads and reciprocating within said shear plates and knives carried by said bars and reciprocating within said plates, means for feeding splints through said plates to each of said knives, said feeding means operating in response to the rotation of the driving shaft and independent automatically operated means for discontinuing the feed to any one of said knives.

17. In a match machine a plurality of reciprocating knives, a driving shaft actuating said knives and means driven from said shaft for feeding veneer strips in groups to each of said knives and automatic means for interrupting the operation of the feeding means for each of said groups independently.

18. In a match machine a driving shaft reciprocating knives driven therefrom, means responsive to the rotation of said shaft for feeding veneer strips in groups to said knives and means for automatically discontinuing said feed and means responsive to the rotation of said shaft for alternately longitudinally displacing the splints as they are fed from the machine.

PETER C. FORRESTER.

Witnesses:
GENEVA HIRTH,
F. S. CHISHOLM.

Copies of this patent may be obtained for five cents each, by addressing the "Commissioner of Patents, Washington, D. C."